United States Patent [19]

Rabe

[11] Patent Number: 4,648,307
[45] Date of Patent: Mar. 10, 1987

[54] UNLOADING VALVE FOR POWER STEERING PISTON WITH INTEGRAL GEAR

[75] Inventor: William T. Rabe, Lafayette, Ind.

[73] Assignee: TRW, Inc., Lyndhurst, Ohio

[21] Appl. No.: 785,983

[22] Filed: Oct. 10, 1985

[51] Int. Cl.$^4$ .................. F15B 9/10; F15B 15/22; F15B 13/04

[52] U.S. Cl. .................. 91/375 A; 91/401; 91/437; 251/362

[58] Field of Search .......... 91/375 R, 375 A, 401, 91/224, 229, 437; 251/362; 137/543.23, 533.13, 533.15

[56] References Cited

U.S. PATENT DOCUMENTS

| | | | |
|---|---|---|---|
| 3,092,083 | 6/1963 | Sheppard | 91/401 X |
| 3,181,429 | 5/1965 | Washbond | 91/401 |
| 3,896,702 | 7/1975 | Shah et al. | 91/375 A |
| 3,896,703 | 7/1975 | Bertanza | 91/375 A X |
| 3,921,669 | 11/1975 | Goff | 91/375 A X |
| 3,935,790 | 2/1976 | Goff | 91/375 A |
| 4,170,925 | 10/1979 | Katz et al. | 91/400 |
| 4,236,692 | 12/1980 | Williamson | 251/362 X |
| 4,261,248 | 4/1981 | Elser et al. | 91/401 |
| 4,367,672 | 1/1983 | Elser | 91/401 X |

FOREIGN PATENT DOCUMENTS

1125999 11/1956 France .................. 91/401

Primary Examiner—Robert E. Garrett
Assistant Examiner—George Kapsalas
Attorney, Agent, or Firm—Tarolli, Sundheim & Covell

[57] ABSTRACT

A power assist steering gear for use in vehicles having a housing that defines a chamber. A piston dividing the chamber into first and second chamber portions. The piston is movable through a work stroke in opposite directions in the chamber. A steering valve directs fluid pressure into the first chamber portion and vents the second chamber portion to effect piston movement in a first direction and directs fluid pressure into the second chamber portion and vents the first chamber portion to effect piston movement in a second direction. An input shaft moves to effect actuation of the steering valve. A relief valve for communicates the first and second chamber portions when the piston is near the end of its work stroke. The relief valve has a valve member and valve seat which are movable between a closed position blocking communication between the first and second chambers and a fully open position establishing communication between the first and second chambers when the piston reaches the end of its work stroke. A press-fit connection effects adjustment of, in response to movement of the input shaft, the position in the piston path at which the valve member and valve seat move relatively to an open position.

14 Claims, 7 Drawing Figures

UNLOADING VALVE FOR POWER STEERING PISTON WITH INTEGRAL GEAR

BACKGROUND OF THE INVENTION

The present invention relates to a steering gear and particularly to a hydraulic power assist steering gear.

Hydraulic power assist steering gears are well known. Typically, such steering gears include a housing which defines a chamber. A piston divides the chamber into first and second chamber portions. The piston is movable in a work stroke within the chamber due to fluid pressure. A steering valve directs fluid into one of the chamber portions and vents the other chamber portion to effect movement of the piston in a given direction. An input shaft is rotated by the driver of the vehicle to effect actuation of the steering valve. The piston is drivingly connected to the vehicle steering mechanism to effect actuation thereof upon movement of the piston.

The vehicle steering mechanism has stops which limit the amount of movement of the steered wheels in both directions of turning. Typically, a stop is fixed to the axle and another stop is movable with the steered wheel and can engage the stop fixed to the axle to limit movement of the steered wheels in one direction. Similar stops engage to limit movement of the steered wheels in the opposite direction. The amount of movement of the steered wheels before the stops engage may vary from vehicle to vehicle because of manufacturing tolerances and other factors. The piston in the power steering gear moves through a work stroke, the length of which is proportioned to the amount of movement of the steered wheels before the stops engage.

A known steering gear includes relief valves which are carried by the piston. The relief valves, commonly known as end-of-stroke relief valves, allow fluid communication between the chamber portions on opposite sides of the piston as the piston approaches the end of its work stroke in either direction and just prior to engagement of the stops. The end of stroke relief valves operate to preclude the trapping of hydraulic fluid in the fluid exhausting chamber portion, and prevent high pressure build-up which could damage the steering gear housing. The relief valves as shown in U.S. Pat. No. 3,935,790 include a valve seat fixed to the piston and a valve member which moves relative to its valve seat. As the piston approaches the end of its work stroke, one relief valve at the high pressure chamber portion is open and the valve member of the other relief valve moves relative to its valve seat to open the valve. This allows fluid communication between the chamber portions on opposite sides of the piston.

Typically, the relief valve member moves relative to its valve seat upon engagement with an adjustment screw located in the housing of the steering gear. Upon initial engagement with the adjustment screw and continued movement of the piston after such engagement, the valve member moves relative to its valve seat to effect opening of the relief valve to communicate the opposite chamber portions. The relief valves function to communicate the chamber portions when the steering mechanism stops are engaged. This relieves the pressure on the power steering pump and reduces the forces acting on the mechanical parts of the steering mechanism.

The location of the piston where a relief valve opens is critical since the relief valve is to open just prior to engagement of the steering mechanism stops. This location can be adjusted by turning the adjustment screw, which then engages the valve member at a different piston location.

The adjustment of the adjusting screws has been accomplished in the past by two persons. One person rotates the steering wheel until the steering mechanism stops are engaged. When the stops are engaged the adjustment screw is adjusted by another person to move the valve member to its open position. Obviously, this is a cumbersome and costly procedure.

SUMMARY OF THE INVENTION

The present invention is a steering gear constructed in a manner that enables the relief valves to be adjusted to open at the proper piston position merely by rotation of the steering wheel to the position of maximum travel in both directions. Thus, the adjustment is effected (i) by one person and (ii) in response to turning the steering wheel.

Further, the present invention does not require adjusting screws or the like which are engaged by the relief valve members and which must be manually turned. This eliminates parts, assembly steps, and paths for fluid leakage.

In accordance with the present invention, a relief valve comprises a valve seat and a valve member. The valve member and valve seat are carried by the piston and move with the piston during its work stroke. Near the end of the piston work stroke, the relief valve member moves relative to its valve seat to open and thereby communicate the chambers on opposite sides of the piston. In this respect, the present invention is similar to the prior art.

The present invention differs from the prior art in that the valve seat of the relief valve is adjustably connected to the piston and the adjustable connection is such that the valve seat can be moved relative to the piston in response to rotation of the steering wheel and engagement with the steering gear housing. Specifically, on rotation of the steering wheel, the piston is moved toward the end of its work stroke. When the piston nears the end of its work stroke, the valve member carried by the piston engages the housing, and the valve member is moved to an open position relative to its valve seat on continued movement of the piston. If after the valve member is in its open position further turning of the steering wheel can be effected, because the steering stops have not engaged, the valve seat and valve member will move together relative to the piston. Thus, when the stops do engage the valve and valve seat are adjusted relative to the piston and are in the open position.

To allow for movement of the valve seat relative to the piston to occur, there is an adjustable connection between the valve seat and the piston. The adjustable connection is preferably a press-fit connection which enables the valve seat to be moved relative to the piston member in response to turning of the steering wheel.

DESCRIPTION OF THE DRAWINGS

Further features and objects of the present invention will become apparent to those skilled in the art to which the invention relates from a reading of the following specification with references to the accompanying drawings in which.

DESCRIPTION OF A PREFERRED EMBODIMENT

Figure 1:
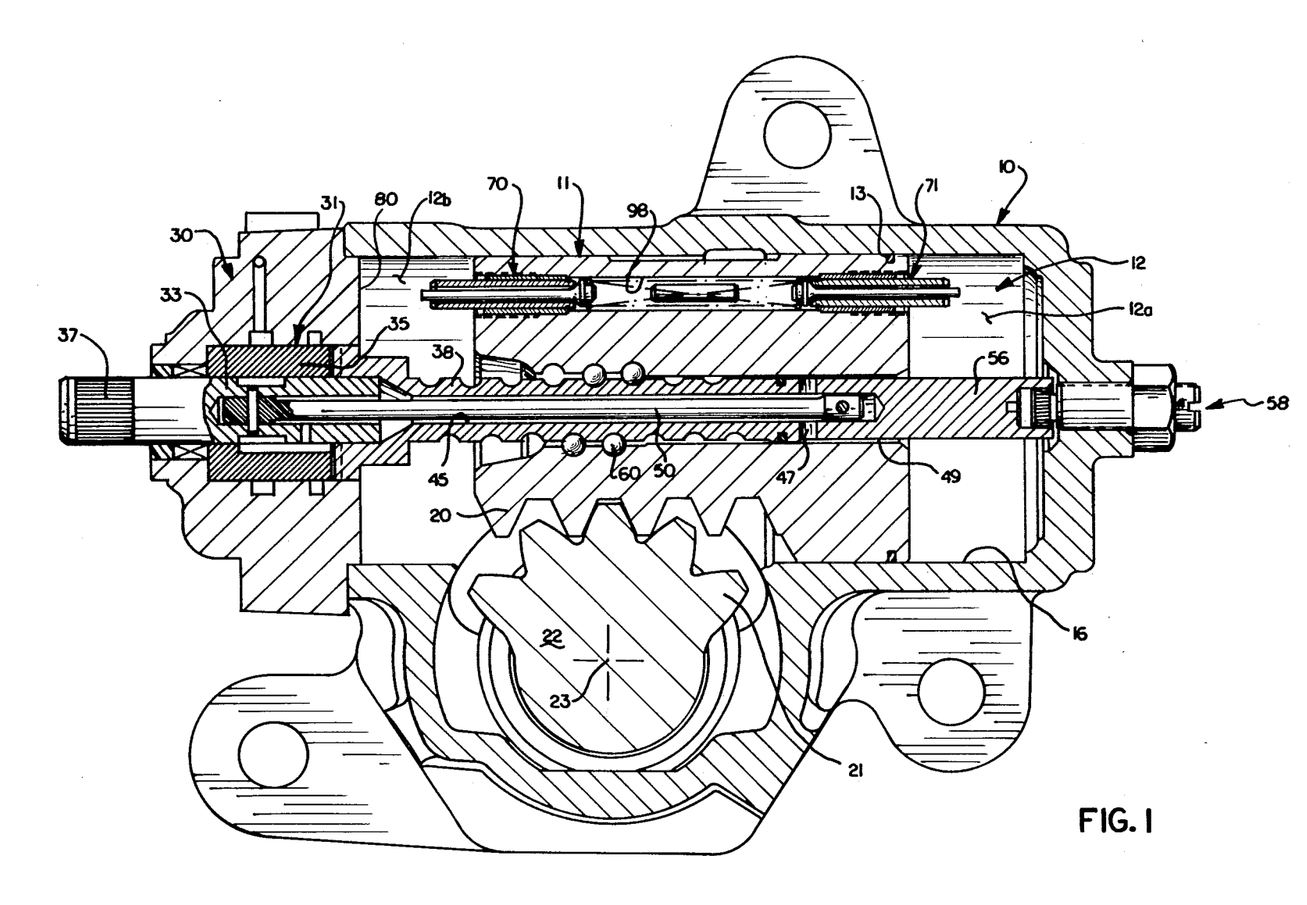
FIG. 1 is an axial cross-sectional view of a steering gear embodying the present invention.

The present invention relates to a steering gear and particularly to a hydraulic power assist steering gear for use in vehicles. The hydraulic power assist steering gear includes a housing 10 (FIG. 1). The housing 10 defines a cylindrical chamber 12 in which a piston 11 is located. The piston 11 divides the chamber 12 into chamber portions 12a and 12b. The piston 11 carries a seal 13 in running contact with a surface 16, which partially defines chamber 12. The seal 13 hydraulically separates the chamber portions 12a and 12b.

Figure 2:
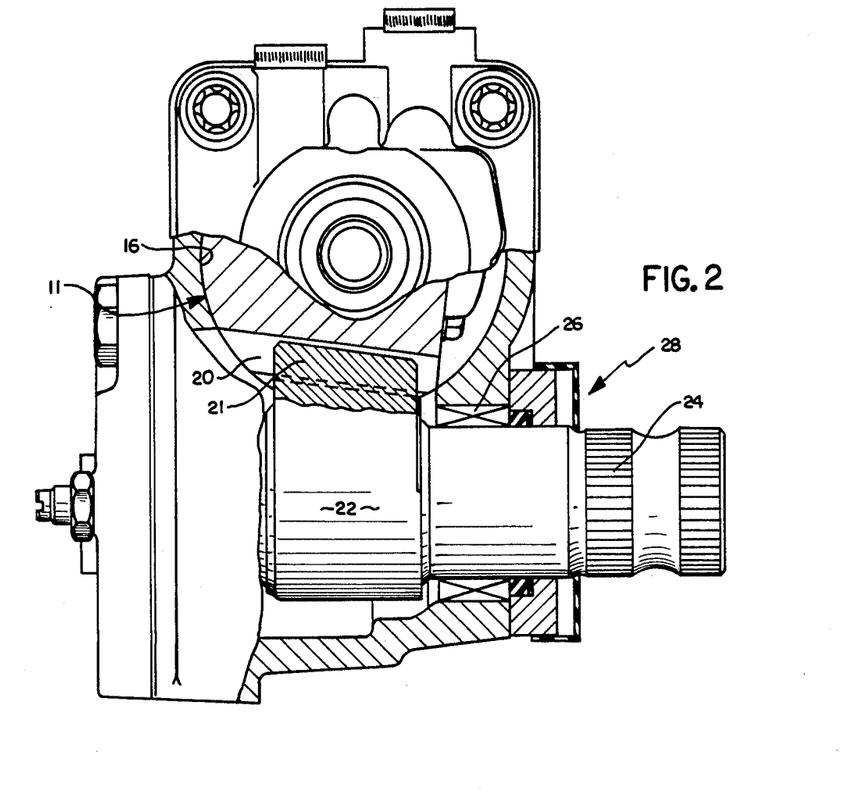
FIG. 2 is an end elevational view of the steering gear of FIG. 1 broken away and showing certain parts in section.

The outer periphery of a portion of the piston 11 includes a plurality of gear teeth 20. The gear teeth 20 mesh with gear teeth 21 of a sector gear 22. Movement of the piston 11 causes the sector gear 22 to rotate about an axis 23. The sector gear 22 (FIG. 2) is attached to an output shaft 24 having an axis of rotation which is coaxial with the axis 23 (FIG. 1). The output shaft 24 (FIG. 2) is mounted for rotation relative to the housing 10 in a bearing 26. A suitable seal arrangement 28 encircles shaft 24 and prevents the entrance of dirt and the like into the interior of the housing. The shaft 24 is connected by a well known mechanism, such as a pitman arm (not shown), to the steering linkage mechanism of the vehicle to effect turning of the steered wheels of the vehicle upon rotation of the shaft 24.

From the above, it should be clear that as the piston 11 (FIG. 1) moves to the right or left in the chamber 12 the sector gear 22 will be correspondingly moved which in turn rotates the shaft 24 (FIG. 2) to cause steering of the vehicle through an appropriate linkage assembly.

The chamber 12 (FIG. 1) of the housing 10 is enclosed at one end by a valve housing portion 30. The valve housing portion 30 contains a power steering valve 31. The power steering valve 31 is of conventional construction and will not be described in detail. U.S. Pat. Nos. 3,896,702 and 3,921,669 disclose a similar valve and are hereby incorporated herein by reference. Specifically, the valve 31 controls the flow of pressurized hydraulic fluid into the chamber portion 12a or 12b while venting the other chamber portion. The pressurized fluid moves the piston 11 in a work stroke to the right or left, as viewed in FIG. 1, to provide a power assist for steering the vehicle.

In general, the valve member 31 includes two valve parts 33 and 35. Valve part 33 is drivingly connected to the input shaft 37 which is connected to a vehicle steering wheel. The valve parts 33 and 35 are rotatable in the valve housing 30. The valve part 35 is drivingly connected to a screw shaft 38 which in turn is associated with the piston 11 and rotates the valve part 35 in a "follow up" manner as the piston 11 moves, as is well known. Valve parts 33 and 35 are rotatable relative to one another for a limited amount of rotation. When the rotational limit is reached in one direction of relative rotation, the valve parts 33 and 35 become drivingly engaged in that one direction.

The input shaft 37 is suitably connected to the steering wheel of the vehicle and rotates about its own axis upon rotation of the steering wheel. When the input shaft 37 rotates, it moves the valve part 33 relative to the valve part 35. When the valve part 33 moves relative to the valve part 35, pressurized fluid is conducted to either the chamber portion 12a or the chamber portion 12b depending on the direction of input shaft 37 rotation. Specifically, pressurized fluid may be directed from the valve 31 through a chamber or passage 45 located interiorly of the screw member 38 and to openings 47 which communicate with the passage 45. The openings 47 communicate with a passage portion 49 formed on the interior of the piston 11. The passage portion 49 communicates with the chamber 12a. Alternatively, the fluid may flow into the chamber 12b through suitable passages (not shown) located in the valve housing 30. If the fluid flows into the chamber portion 12a, the chamber portion 12b is vented by the valve member 31 to tank (not shown). If the fluid flows into the chamber portion 12b, the chamber portion 12a is vented to the tank through passage 49, the radial openings 47, the passage 45 and the valve member 31. All this is well known and will not be described in greater detail since such is within the domain of one skilled in the art and described in each of the above patents and others.

The steering gear includes a torsion bar 50 located between the valve member 31 and the end of the housing 10 of the steering gear. One end of the torsion bar 50 is fixedly attached to the input shaft 37 which in turn is drivingly connected to the valve part 33. The other end of the torsion bar 50 is pinned to a base portion 56 of the screw member 38 which in turn is journaled by a suitable mechanism generally designated 58, to the housing 10 of the steering gear. Also, suitable balls, designated 60, are interposed between the outer diameter of the screw member 38 and the inner diameter of the piston passage 49.

In the event of a failure in the power assist system, such as a failure of the power steering pump, the valve part 33 rotates relative to valve part 35 to its limit. Specifically, upon turning the steering shaft 37, the valve part 33 will rotate relative to the valve part 35 as a result of a twisting of the torsion bar 50 until interengaging parts (not shown) of these valves engage. The valve parts 33 and 35 are then drivingly engaged, as is known, and further turning of the shaft 37 will cause the screw member 38 to rotate. As the screw member 38 rotates, the balls 60 will effect a transverse or axial movement of the piston 11 in the chamber 12, depending upon the direction of the turning of the input shaft 37. As a result, steering of the vehicle will occur in the appropriate direction by the manual turning of the shaft 37.

From the above it should be apparent to one skilled in the art that turning of the steering wheel will cause rotation of the input shaft 37. Rotation of the input shaft 37 causes a turning of the valve part 33 relative to the valve part 35 due to twisting of the torsion bar 50. Fluid will be directed to either chamber 12b or 12a and the other chamber will be vented to tank. As a result, fluid pressure will act upon the piston 11 to effect a power assist of the vehicle steering. As the piston 11 moves in the chamber 12, the piston will effect rotation of the screw member 38, which in turn will cause movement of the valve part 35 back to a neutral position relative to the valve part 33 so as to stop the flow of fluid to the power assist chambers 12a or 12b when steering wheel rotation ha been terminated.

Vehicles in which the power steering gear 10, is used have steering stops to limit the amount of rotational displacement of the steered wheels of the vehicle. Such stops are well known and are not shown. These stops are typically located on the axle of the vehicle and on the spindle of the vehicle which supports a steered wheel and turns with it during steering. Because of tolerances in the manufacture of vehicles, the angular distance that the spindles can move before the stops engage may vary from vehicle to vehicle. Rotational displacement of the spindle is related to rotational displacement of the gear sector 22 which in turn is related to displacement of the piston 11. As a result, the amount of axial movement of the piston 11 may vary from vehicle to vehicle even in closely related vehicle models. The amount of piston movement should be proportional to the maximum amount of angular movement of the steered wheels of the vehicle before the stops engage.

In order to insure that piston movement ceases when the stops engage, relief valves 70, 71 (FIG. 1) are provided. The relief valves 70 and 71 are carried by the piston 11. The relief valves 70 and 71 function to relieve the pressure in chamber 12a or 12b depending upon which chamber has fluid pressure being directed to it. Specifically, these valves operate to vent the chamber 12a or 12b just prior to engagement of the steering mechanism stops. As a result, the power steering pump, the steering mechanism, the piston teeth 20, and sector gear teeth 21 are protected from repeated hydraulic and mechanical loads transmitted thereto as is well known.

The relief valves 70 and 71 are of identical construction. Thus, only the relief valve 70 will be described in detail. Corresponding reference numerals will be used to illustrate the parts of the relief valves 70 and 71 with a prime added for the parts of relief valve 71.

Figure 3:
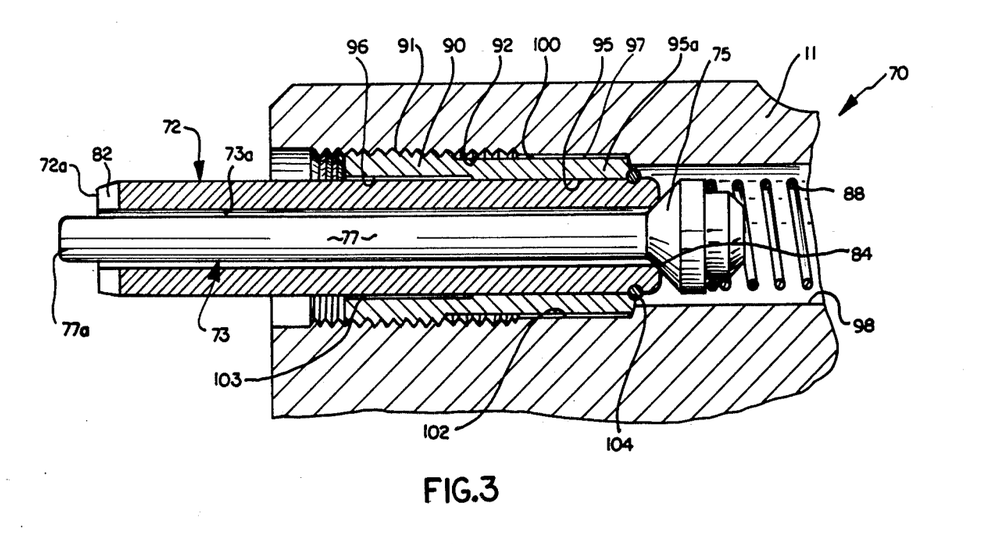
FIG. 3 is a sectional view on an enlarged scale of a portion of the steering gear of FIG. 1.
Figure 4:
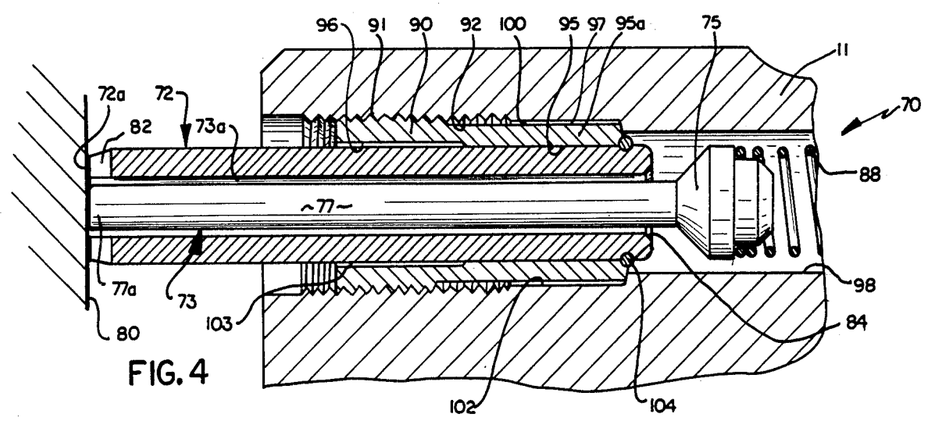
FIG. 4 is a sectional view similar to FIG. 3 but illustrating a relief valve prior to adjustment relative to the piston.
Figure 6:
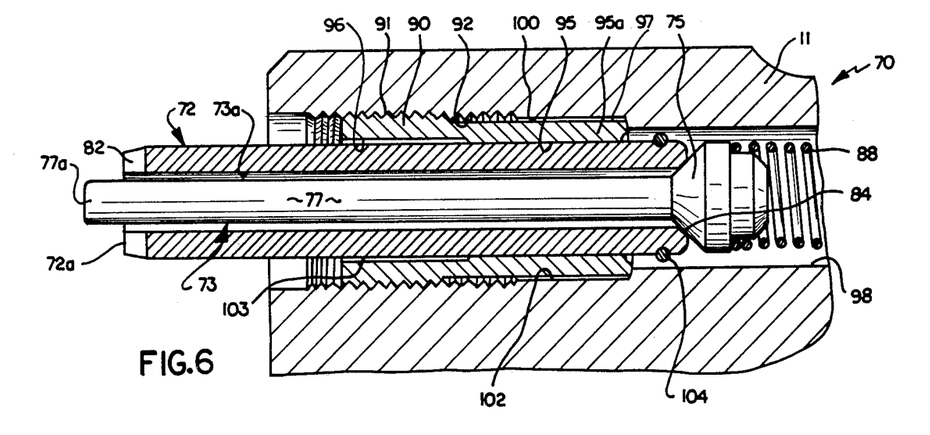
FIG. 6 is a sectional view similar to FIG. 3 but illustrating a relief valve after adjustment relative to the piston and in a closed condition.

The relief valve 70 (FIG. 3) includes a valve seat 72 and a valve member 73. The valve member 73 has a conical valve portion or valve head 75 which engages the valve seat 72. The valve seat 72 has a conical face 84 which engages the valve head 75 to effect a seal. The valve member 73 is biased by a spring 88 into engagement with the valve seat 72. The valve member 73 has an elongated cylindrical portion 77 which extends coaxially through the elongated valve seat 72. The clearance between the elongated portion 77 and the valve seat is designated as passage 73a. The elongated portion 77 has a tip portion 77a which projects beyond the end 72a of the valve seat when the valve head 75 sealingly engages the valve seat 72, as shown in FIGS. 3 and 6. The end 72a (FIG. 3) of the valve seat 72 has a slot 82 extending therethrough. The slot 82 allows communication to be maintained between the chamber 12 and passage 73a when the valve seat 72 engages the housing wall 80 (FIG. 4).

Figure 7:
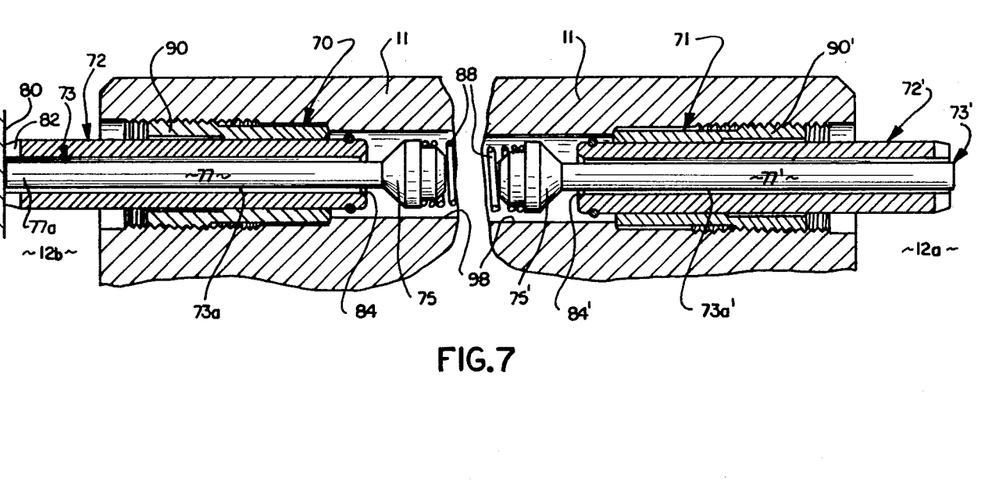
FIG. 7 is a sectional view illustrating the manner in which the relief valves cooperate to communicate the chambers on opposite sides of the steering gear piston.

As seen in FIG. 7, when the piston 11 moves to the left near the end of its travel, the tip portion 77a of the valve member 73 engages the housing wall 80. On continued movement of the piston 11 the valve member 73 moves relative to the valve seat 72 causing the valve head 75 to move away from the valve seat face 84. This allows fluid to flow past the valve head 75. The piston member 11 moves toward the left as shown in FIG. 7 because of fluid pressure acting in chamber 12a. The fluid pressure in chamber 12a acts on the valve head 75' of the valve 71 through passage 73a' causing the valve member 73' to overcome the bias of spring 88 and to be positioned away from its valve seat face 84'. As a result, when the valve head 75 moves away from the valve seat face 84 of the valve 70, the fluid pressure in chamber 12a is communicated through the relief valves 70, 71 to the chamber 12b. Specifically, the pressurized fluid in chamber 12a is vented through the passage 73a' in the valve seat 72' past the valve head 75' into a passage 98 in the piston 11 in which the valves 71 and 70 are located, past the now open valve head 75 of valve 70, through the passage 73a and through slot 82 and into chamber 12b which is vented to tank by valve 31. Obviously, if the piston 11 was moving in the opposite direction, the venting of chamber 12b would be in the reverse.

The valve seat 72 (FIG. 3) is supported in the piston 11 by a threaded connector 90. The threaded connector 90 has a partially threaded portion 91 which threads into a threaded portion 92 of the passage 98. The threaded portion 91 is located at one end of the connector 90. The other connector end portion 95a has an internal diameter 95 which is press-fit onto the outer diameter of the valve seat 72. The outer diameter of the valve seat 72 prior to assembly is slightly larger, for example ranging from 0.0002–0.003 inch depending on the materials of which the valve seat and connectors are made, than the inner diameter 95 of threaded connector 90. The parts can be assembled by a mechanical pressing force or by elevating the temperature of the threaded connector so that it expands enough to slip over the valve seat 72 and then allowing it to cool and shrink onto the valve seat 72. The outer diameter 97 of the end portion 95a of the connector 92 is smaller than the major diameter of the threaded portion 91 and has a clearance 100 between it and the open portion 102 of the piston 11 in which the connector member 92 is located. There is a similar clearance 103 between the valve seat 72 and threaded connector member 90 due to diameter 96 being larger than diameter 95. These clearances 100 and 103 assure that the threaded portion 91 will not be deformed due to the press-fit. A retaining ring 104 is fixed on the valve seat member 72 to limit the amount of movement of the valve seat 72 into the connector member 90 during assembly.

The press-fit connection enables the valve seat 72 (FIG. 4) to be adjusted relative to the piston 11. This adjustment can be made by merely rotating the steering wheel of the vehicle, in which the steering gear is mounted.

Figure 5:
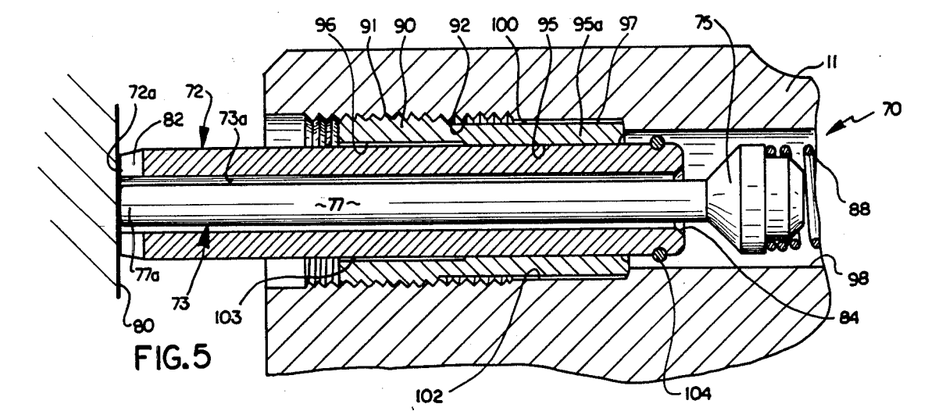
FIG. 5 is a sectional view similar to FIG. 3 but illustrating a relief valve after adjustment relative to the piston and, in an open condition.

Specifically, once the valves 70 and 71 are assembled in the piston 11 and the steering gear is installed in a vehicle, the vehicle steering wheel is then turned and adjustment of the relief valves is effected in response to such turning. As the steering wheel is turned, for example in a direction to cause the relief valve 70 (FIG. 4) to move toward the wall surface 80 of the valve housing 31, the projecting tip 77a of the valve member 73 will engage the wall surface 80 and unseat the valve head 75 from the valve seat face 84. If, however, the stops of the steering mechanism have not engaged, the steering wheel can still be rotated and the piston 11 will continue to move. The continued rotation of the steering wheel and movement of the piston 11 will cause the valve seat 72 to engage the wall surface 80 and to move axially relative to the piston 11 and connector member 90. Specifically, the press-fit connection 100 will be overcome by continued movement of piston 11 due to the manual turning of the steering wheel. The amount of this relative movement, for example, which is illustrated in FIG. 5 causes the retainer member 104 to move away from the connector 90 into a position such as shown in FIG. 5. The turning of the steering wheel and positioning of the valve seat 72 will continue until the steering mechanism stops are engaged.

The press-fit connection between the valve seat 72 and connector 90 retains the valve seat 72 in place when subjected to the bias of spring 88 and fluid operating pressure. However, the press fit allows movement of the valve seat as described above.

A similar adjustment of the valve 71 will occur by turning the steering wheel in the opposite direction and causing the valve member 73' and the valve seat 72' to move relative to the connector 90' for the valve member 71. In this manner the valves 70 and 71 may be adjusted to open to vent the chambers 12a, 12b when the piston is at the limit of its movement and the steering stops are engaged. Thus, this adjustment of the relief valves 70 and 71 is effected automatically in response to turning the steering wheel.

I claim:

1. A steering gear comprising:
   a housing defining a chamber,
   a piston dividing the chamber into first and second chamber portions, said piston being movable through a work stroke in opposite directions in said chamber,
   steering valve means for directing fluid pressure into said first chamber portion and venting said second chamber portion to effect piston movement in a first direction and for directing fluid pressure into said second chamber portion and venting said first chamber portion to effect piston movement in a second direction,
   an input shaft movable to effect actuation of said steering valve means,
   relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke, and
   means for enabling adjustment of said relief valve means in response to movement of said input shaft to cause said relief valve means to open at the end of the piston work stroke.

2. A steering gear as defined by claim 1 wherein said means for enabling adjustment comprises a press-fit connnection between said piston and said valve seat.

3. A steering gear as defined in claim 2 wherein a portion of said valve member projects beyond said valve seat and which engages a part of said housing on movement of said piston and moves relative to said valve seat on continued movement of said piston, and a portion of said valve seat projects beyond said piston to engage said housing and move relative to said housing to effect said adjustment upon overcoming said press-fit connection on continued movement of said piston after said valve seat engages said housing.

4. A steering gear as defined in claim 1 wherein said means for enabling adjustment of said relief valve means comprises means for enabling adjustment of the position of said valve seat relative to said piston.

5. A steering gear as defined in claim 1 wherein said means for adjusting comprises a press-fit connection between said piston and said valve seat and a projection on said valve seat which engages said housing and overcomes said press-fit connection on continued movement of said piston after said valve seat projection engages said housing.

6. A steering gear comprising:
   a housing defining a chamber,
   a piston dividing the chamber into first and second chamber portions, said piston being movable through a work stroke in opposite directions in said chamber,
   steering valve means for directing fluid pressure into said first chamber portion and venting said second chamber portion to effect piston movement in a first direction and for directing fluid pressure into said second chamber portion and venting said first chamber portion to effect piston movement in a second direction,
   an input shaft movable to effect actuation of said steering valve means, and
   relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke,
   said valve seat having a press-fit connection with said piston which may be overcome by turning of said input shaft to adjust the position of said valve seat relative to said piston.

7. A steering gearing comprising:
   a housing defining a chamber,
   a piston dividing the chamber into first and second chamber portions, said piston being movable through a work stroke in opposite directions in said chamber,
   steering valve means for directing fluid pressure into said first chamber portion and venting said second chamber portion to effect piston movement in a first direction and for directing fluid pressure into said second chamber portion and venting said first chamber portion to effect piston movement in a second direction,
   an input shaft movable to effect actuation of said steering valve means,
   relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke, and means for adjusting said relief valve means in response to rotation of said input shaft to cause said relief valve means to open at the end of the piston work stroke.

8. A steering gear comprising:

a housing defining a chamber, a piston dividing the chamber into first and second chamber portions, said piston being movable through a work stroke in opposite directions in said chamber, steering valve means for directing fluid pressure into said first chamber portion and venting said second chamber portion to effect piston movement in a first direction and for directing fluid pressure into said second chamber portion and venting said first chamber portion to effect piston movement in a second direction, an input shaft movable to effect actuation of said steering valve means, relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke, and means for enabling adjustment of said relief valve means in response to movement of said input shaft to cause said relief valve means to open at the end of the piston work stroke, said means for enabling adjustment comprising a press-fit connection between said piston and said valve seat, said valve member having a portion projecting beyond said valve seat and which engages a part of said housing on movement of said piston and moves relative to said valve seat on continued movement of said piston, and said valve seat having a portion projecting beyond said piston to engage said housing and which moves relative to said housing to effect said adjustment upon overcoming said press-fit connection on continued movement of said piston after said valve seat engages said housing;

said press-fit connection including a tubular connector having an externally threaded portion threaded into a portion of said piston, said valve seat and tubular connector having press-fit portions interconnecting them, said threaded portion being spaced along the piston path from said press-fit portions.

9. A steering gear as defined in claim 8 wherein a first clearance is established between said threaded portion of said connector and an outer diameter portion of said valve seat and a second clearance is established between said piston and the portion of said connector which is press-fit to said valve seat.

10. A steering gear comprising:

a housing defining a chamber, a piston dividing the chamber into first and second chamber portions, said piston being movable through a work stroke in opposite directions in said chamber, steering valve means for directing fluid pressure into said first chamber portion and venting said second chamber portion to effect piston movement in a first direction and for directing fluid pressure into said second chamber portion and venting said first chamber portion to effect piston movement in a second direction, an input shaft movable to effect actuation of said steering valve means, and relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke, said valve seat having a press-fit connection with said piston which may be overcome by turning of said input shaft to adjust the position of said valve seat relative to said piston, said piston having a passage extending axially therethrough, said passage having threaded end portions;

a connector having a first cylindrical inside surface extending coaxially therethrough for receiving said valve seat and said connector having a threaded end portion on the outside surface having a major diameter for threaded engagement with said threaded passage end portions in said piston;

a spring for biasing said relief valve member into sealing engagement with said relief valve seat;

said valve seat extending coaxially with said first cylindrical inside surface of said connector and forming said press-fit connection therewith, said press-fit connection allowing the valve seat to move axially inward in the passage when the valve seat engages an inner surface of said chamber to establish said valve member in an open position coincident with said piston reaching the end of its work stroke, and said press-fit connection being sufficient to prevent the valve seat from moving axially outward in the passage due to fluid and spring pressure.

11. A steering gear as set forth in claim 10 wherein said connector has a second cylindrical inside surface, larger in diameter than the first cylindrical inside surface, said second cylindrical inside surface being coaxial with said first cylindrical inside surface and spaced along the connector from said first cylindrical inside surface, and said connector has an outside cylindrical surface portion larger in diameter than the second cylindrical inside surface and smaller in diameter than the major diameter of said threaded end portion and which extends on said connector adjacent to the threaded end portion for the remaining length of said connector coaxially with said first cylindrical inside surface.

12. Apparatus comprising:

a housing defining a chamber, a piston dividing the chamber into first and second chamber portions, said piston being movable through a work stroke in opposite directions in said chamber, valve means for directing fluid pressure into said first chamber portion and venting said second chamber portion to effect piston movement in a first direction and for directing fluid pressure into said second chamber portion and venting said first chamer portion to effect piston movement in a second direction, a member movable to effect actuation of said valve means, relief valve means for communicating said first and second chamber portions when said piston is near the end of its work stroke, said relief valve means comprising a valve member and valve seat which are movable relatively between a closed position blocking communication between said first and second chambers and a fully open position establishing communication between said first and second chambers when said piston reaches the end of its work stroke, and means for enabling adjustment of said relief valve means in response to movement of said member to cause said relief valve means to open at the end of the piston work stroke, said means for enabling adjustment comprising a press-fit connection between said piston and said valve seat.

13. Apparatus comprising:

a housing defining a chamber, a piston dividing the chamber into first and second chamber portions, said pisto being movable through a work stroke in opposite directions in said chamber, valve means for directing fluid pressure into said first chamber portion and venting said second chamber portion to effect piston movement in a first direction and for directing fluid pressure into said second chamber portion and venting said first chamber portion to effect piston movement in a second direction, a member movable to effect actuation of said valve means, relief valve means for communicating said first and second chamber portions when said piston is near the end of its work stroke, said relief valve means comprising a valve member and valve seat which are mmovable relatively between a closed position blocking communication betweewn said first and second chambers and a fully open position establishing communication between said first and second chambers when said piston reaches the end of its work stroke, and means for adjusting said relief valve means in response to movement of said member to cause said relief valve means to open at the end of the piston work stroke.

14. Apparatus as dfined in claim 13 wherein said means for adjusting comprises a press-fit connection between said piston and said valve seat and a projection on said valve seat which engages said housing and overcomes said press-fit connection on continued movement of said piston after said valves seat projection engages said housing.

* * * * *